April 28, 1942. C. T. BREITENSTEIN 2,281,262
STEP-UP MECHANISM
Filed March 14, 1940  2 Sheets-Sheet 1
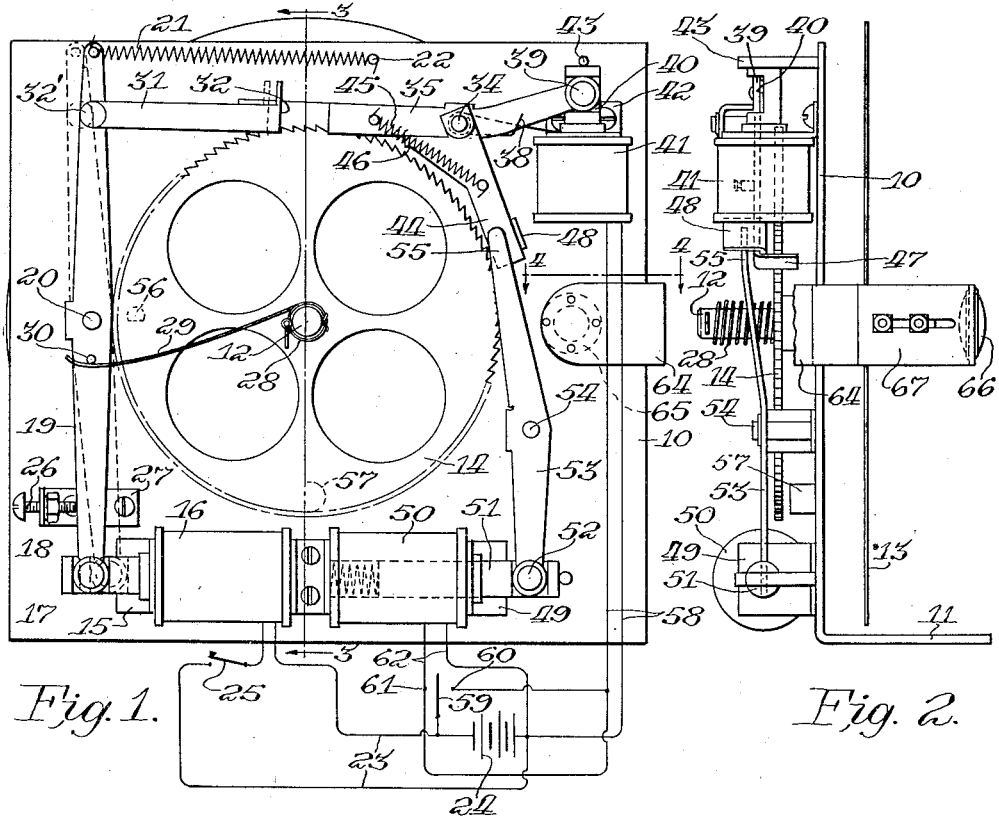
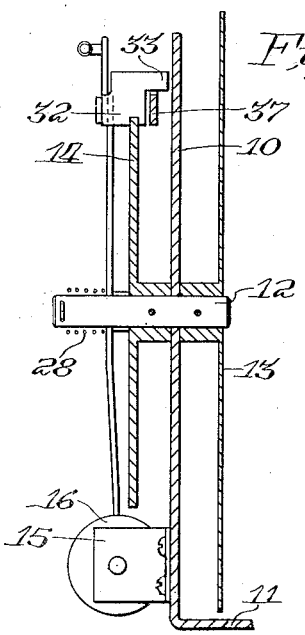
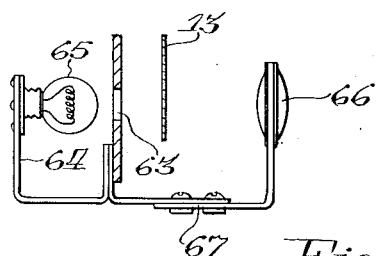
Inventor
Charles T. Breitenstein
By Paul O. Pippel
Atty.

April 28, 1942. C. T. BREITENSTEIN 2,281,262
STEP-UP MECHANISM
Filed March 14, 1940 2 Sheets-Sheet 2
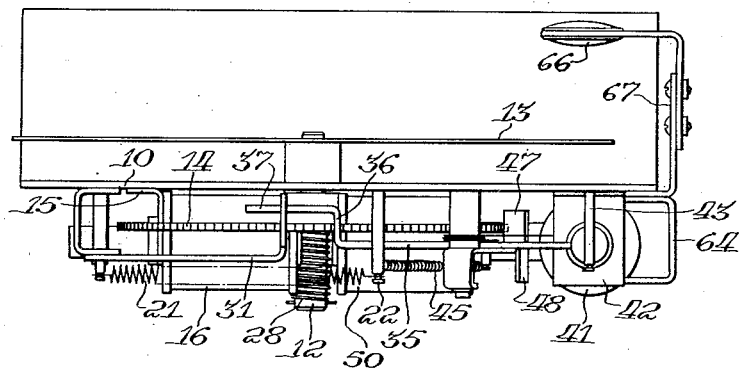
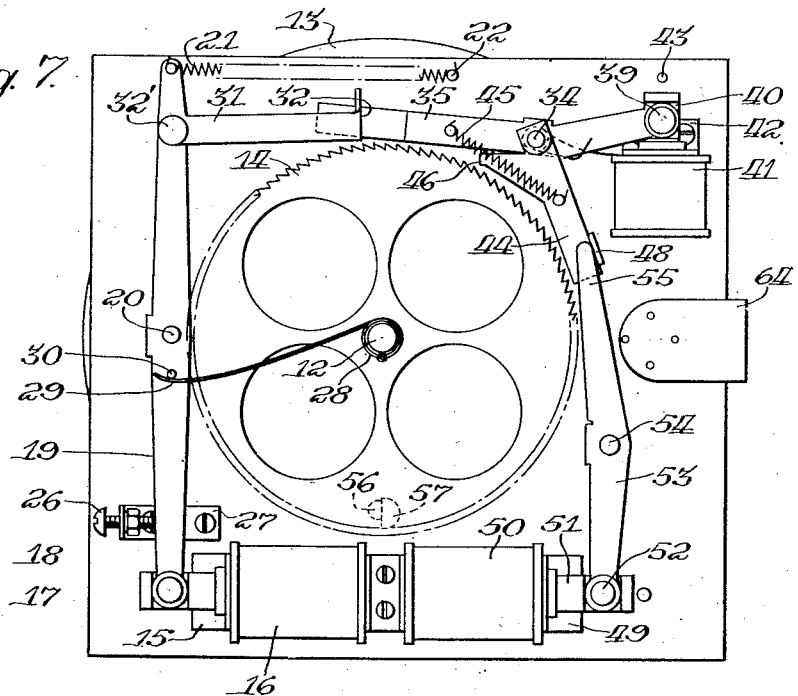
Inventor
Charles T. Breitenstein
By Paul O. Pippel
Atty.

Patented Apr. 28, 1942

2,281,262

UNITED STATES PATENT OFFICE 2,281,262

STEP-UP MECHANISM

Charles T. Breitenstein, Chicago, Ill., assignor to Raymond T. Moloney, Chicago, Ill.

Application March 14, 1940, Serial No. 323,926

7 Claims. (Cl. 74—142)

The invention relates to a combined step-up, escapement and reset unit useful in many arts, such for example, as in amusement apparatus, where a score indicia wheel can be stepped up uniformly as scoring is achieved, then be stepped back uniformly in escapement fashion one step at a time, or be completely reset in a single releaser action as when zeroizing the scoring wheel or resetting a wiper type commutator switch arm usable either with or without the scoring wheel.

The main object of the invention is to provide an improved combined unit having step up, escapement and release mechanism.

Another object is to combine all of these operating parts in a single, standard unit to take the place of separate step up and escapement means heretofore used, thereby to facilitate manufacture, lower costs, and simplify assembly of amusement apparatus and the like with which such units are usable.

Still another object is to provide a mechanism of this kind which will be simple and effective in use with the operative parts cooperating in a simple manner to facilitate their assembly in a compact unit.

Other objects will become apparent to those skilled in this art as the disclosure is more fully made.

Briefly, these desirable objects may be achieved by the provision of a suitable mounting plate or support carrying a shaft for mounting on one side of the plate a ratchet wheel and on the other side a score number projecting wheel, commutator wiper arm, or some other means. The ratchet wheel is stepped up one or more steps, uniformly at a time, depending upon the adjusted setting of a step up pawl means which is electromagnetically operated. The score wheel or wiper arm would be conjointly stepped up with the ratchet wheel. A separate, electromagnetically controlled escapement means is cooperatively associated with the step up pawl means to make possible the return movement of the score wheel or wiper arm with the ratchet wheel in the desired step by step manner; or, by means of an electromagnetically operable releaser cooperably associated with the escapement means and step up means, the ratchet wheel and conjointly movable parts may suddenly be returned to zeroized or initial starting position.

In the drawings, illustrating a preferred example of the invention:

Figure 1 is an elevational view of the improved unit, showing particularly the mode of operation of the step-up means;

Figure 2 is an end elevational view of the unit;

Figure 3 is a vertical sectional view through the unit, taken along the line 3—3 of Figure 1, looking in the direction of the arrows;

Figure 4 is a detail view, partly in section, of an optical system usable when light projecting the score from a score wheel, the view being taken from line 4—4 of Figure 3, looking in the indicated direction;

Figure 5 is a fragmentary detail view of a score wheel;

Figure 6 is a top end view of the unit shown in Figure 1; and,

Figure 7 is a view similar to Figure 1, but illustrating the mechanical parts in positions assumed when resetting to zero or starting position.

The unit comprises a vertical plate or support 10 having a lower horizontal mounting flange 11. As appears best in Figure 3 the plate turnably carries in a central position, a horizontal shaft 12 and said shaft on one side of the plate carries keyed thereto the hub of a scoring disk or wheel 13 provided on its periphery with cutout score numbers running in order as shown in Figure 5. The shaft 12 on the other side of the plate 10 carries fast thereon the hub of a ratchet wheel 14. This ratchet wheel has teeth on its periphery equal in number to the score numbers on the score disk 13, the two wheels 13 and 14 turning as a functionally integral unit with the shaft 12.

At one lower corner of the plate 10 is a bracket 15 for supporting an electromagnet 16 having a core 17 to which is pivotally connected by a pin 18, an upright lever 19 fulcrumed between its ends on a pivot pin 20 carried on the plate 10, while the upper end of said lever is pulled by a rather strong spring 21 connected between the lever and a pin 22 mounted on the plate 10. The coil 16 is in an electrical circuit 23 with a source of energy 24, the circuit normally being open, but closable by a switch 25 in any desired manner. The throw of the lever 19 is regulated by adjusting a set screw 26 carried in a bracket 27 mounted on the plate 10 as shown in Figure 1. A spring 28 is coiled around the shaft 12 having one end thereof anchored thereto, while the opposite end of the said spring terminates in a long leg 29 locked under a stop 30 carried on the lever 19 below its fulcrum.

The spring 21 is really connected at one end to one arm of a bell crank lever 31 fulcrumed at 32' on the upper end of the lever 19. The spring 21 thus pulls the horizontal arm of the bell crank 31 down at its free end against the teeth of the ratchet wheel 14. So that said bell crank arm may function as a driver pawl for said ratchet wheel its free end is bent inwardly toward plate 10 as at 32, said end 32 having an additional raised tail extension 33 also extending toward the plate 10 as best shown in Figure 3.

It can now be seen that when the coil 16 is energized the lever 19 at its upper end moves away from the ratchet to tension the spring 21 so that when the coil 16 is deenergized said spring pulls the lever 19 back to move the horizontal bell crank arm with its pawl end 32 against a tooth of the ratchet wheel 14 to step same up, one, two, or as many tooth steps as is permitted by the setting of the adjustable set screw 26. Of course, as the wheel 14 steps up, the spring 28 becomes tensioned in an obvious manner. The spring 21 always acts to pull the pawl end 32 to duty against the ratchet wheel teeth.

On the upper right hand corner of the plate 10 is a pin 34 for fulcruming between its ends a horizontal lever 35 having at one end an inwardly bent dog portion 36 to engage the teeth of the ratchet wheel and prevent retrograde motion thereof. Said portion 36 is extended to form a tail 37 that is positioned under the tail 33 as shown in Figures 3 and 6. A strong spring 38 coiled about the pin 34 has a leg engaging the lever 35 in a manner always exerting a force to hold the dog portion 36 of the lever pressed into engagement with the teeth of the ratchet wheel 14.

The end of the lever 35 remote from the wheel 14 is pivotally connected by a pin 39 to the core 40 of an electromagnet 41 carried by a bracket 42 mounted on the plate 10. A stop pin 43 on the plate 10 directly above the core 40 acts to limit the stroke of the core in an up direction. Pivotally connected at its upper end to the pin 34 is a pendant lever 44 connected by a spring 45, much weaker than spring 38, to the lever 35, as shown. This lever 44 has an extension 46 to engage under the lever 35 and at its lower end the lever 44 has an inward dog extension 47 (see Figure 2) adapted to engage the ratchet wheel teeth, said lever 44 also having an oppositely extending ear or extension 48. When the electromagnet 41 is energized its core 40 raises the left hand end 36 of the lever 35; the tail 37 also acting to lift the lever 31 and its pawl 32 off the ratchet wheel so that the latter is freed to be driven counterclockwise by the spring 28. However, the latch lever 44 pulled by its spring 45 acts through its dog 47 to engage the ratchet wheel as an escapement control, permitting a retrograde movement of the ratchet wheel of one step.

The lower right hand corner of the plate 10 as viewed in Figure 1 carries a bracket 49 for mounting another electromagnet 50 having a horizontally movable core 51 pivotally connected at its free end by a pin 52 to the lower end of an upright lever 53 pivotally fulcrumed between its ends by a hinge pin 54 mounted on the plate 10. The upper end of the lever 53 is narrowed into a tail portion 55 adapted to engage the extension 48 on the escapement lever 44 heretofore described. When the lever 53 is operated by its coil 50 at the same time with coil 41 and lever 35, then the ratchet wheel 14 is completely freed of any holding devices and the wheel and any part or parts turnable therewith are quickly returned by the drive spring 28 to the zeroized or initial starting position determined by a lug 56 on the back side of the wheel 14 hitting a pin 57 rigid on the mounting plate 10.

The coils 16 and 41 are separately energizable or the coils 41 and 50 may be simultaneously energizable for zeroizing the ratchet wheel. As shown in the wiring diagram of Figure 1 the switch 25 closes wires 23 with the source of energy 24 to energize the coil 16. Wires 58 provide a circuit for the coil 41 when a switch lever 59 is made to contact the point 60. When switch 59 is made to contact point 61, then circuit 62 causes coils 50 and coil 41 to be simultaneously energized. Thus coil 50 always works with coil 41, although coil 41 can be worked independently of coil 50 and, of course, coil 16.

As has been stated the novel and improved unit can be used in various ways; for example, a commutator wiper arm could turn with the ratchet wheel and step up across a circle of contacts carried on a plate proximately positioned to the plate 10, or as herein shown a score legend carrying wheel 13 turns with the ratchet wheel 14. So that a beam of light from a light source may pass through the plate 10 a hole 63 is provided therein as shown in Figure 4. A bracket 64 is secured to the support 10 and carries an electric lamp 65 as a light source in line with the hole 63 on one side of the support 10. This beam of light thus passes through the hole 10 and peripheral edge of the wheel 13 and its cut out score numbers, the light passing through the numbers being concentrated by a projection lens 66 for projection to some suitable screen, not shown, said lens being carried by a bracket 67 also mounted on the support 10. This completes the details of description.

In use and operation, it will be noted a bodily positionable unit is provided in compact form and can be suitably placed in the cabinet of an amusement or other apparatus. In starting, of course, the coils 16, 41 and 50 are all in open circuits and deenergized as viewed in Figure 1. The spring 28 thus holds the stop 56 and wheel 14 against the stop 57 on the frame 10. The set screw 26 is set to limit the throw of lever 19 so that the pawl 32 can engage and step up the ratchet wheel 14 only one step at a time. When switch 25 is momentarily closed by any suitable means the coil 16 is energized to swing the lever 19 outwardly at its top and move lever 31 away from the wheel 14. When the coil 16 is deenergized the spring 21 is effective to pull the pawl part 32 of the lever 31 back to engage and move the wheel 14 one step. As the wheel 14 is so stepped up intermittently, the spring 28 becomes energized and the dog part 36 of the lever 35 engages the ratchet wheel teeth to prevent back lash or retrograde movement thereof. By closing switch 59, 60 a circuit is made by wires 58 to energize the coil 41 independently of the other coils and when the core 40 thereof pulls down, the lever 35 operates as an escapement by raising its dog part 36 off the wheel 14; also by tail 37 raising pawl 32 off the wheel. When parts 36, 32 free the wheel the latch lever dog 47 engages the wheel 14 to hold it against a step back. But when the coil is deenergized the parts 32, 36 reengage the wheel and part 47 frees the wheel and at the instant this occurs the spring 28 drives the wheel 14 back one step, escapement fashion.

When the switch 59, 61 is closed, then the circuits for both coils 50, 41 are closed and the energized coils cause their cores to act so that core 51 swings the upper end of the lever 53 away from the wheel 14 with its tail 55 holding the ear 48 and connected lever 44 with dog 47 clear of the wheel 14. At the same time core 40 operates the lever 35 to clear the dog 36 and by tail 37 the pawl 32 from the wheel 14. Consequently, all holding parts of the wheel 14 are freed simultaneously and the spring 28 is free to turn the ratchet wheel 14 and any parts turnable therewith, such as the score disk 13 or a wiper arm, back to the initial starting or zeroized position.

It can now be seen that an improved step-up, escapement, and zeroizing means has been provided in accordance with the objects of the invention heretofore recited.

The intention is to cover herein all such changes and modifications of the selected embodiment disclosed which do not in material respects constitute departures from the spirit and scope of the invention as defined in the subjoined claims.

What is claimed is:

1. In a device of the class described, a support, a ratchet wheel turnably mounted about an axis on the support, an element movable with the wheel as a functionally integral part thereof, a lever swingably mounted on the support including a spring urged pawl to engage and step up the wheel, a second lever mounted on the support including a spring urged dog to engage the ratchet wheel, a latch lever fulcrumed coaxially with the second lever and having a part resiliently held against the second lever normally to hold a dog portion on the latch lever free of the ratchet wheel teeth, the respective pawl and dog of the first two levers including interrelated portions whereby the pawl may act to step up the wheel without acting on the dog and when the second lever is swung to clear the ratchet wheel the portions act to free the pawl from the wheel, and separate actuating devices for the first two levers, the latch lever dog portion engaging and stopping the wheel when the second lever is actuated to free the pawl and its dog from the wheel.

2. In a device of the class described, a support, a ratchet wheel turnably mounted about an axis on the support, an element movable with the wheel as a functionally integral part thereof, a lever swingably mounted on the support including a spring urged pawl to engage and step up the wheel, a second lever mounted on the support including a spring urged dog to engage the ratchet wheel, a latch lever fulcrumed coaxially with the second lever and having a part resiliently held against the second lever normally to hold a dog portion on the latch lever free of the ratchet wheel teeth, the respective pawl and dog of the first two levers including interrelated portions whereby the pawl may act to step up the wheel without acting on the dog and when the second lever is swung to clear the ratchet wheel the portions act to free the pawl from the wheel, separate actuating devices for the first two levers, the latch lever dog portion engaging and stopping the wheel when the second lever is actuated to free the pawl and its dog from the wheel, a third lever carried on the support including a separate actuating device, means on the latch lever engageable by the third lever, and means whereby the second and third levers may be simultaneously swung to clear all pawl and dog parts from the ratchet wheel.

3. A combined step-up, escapement and reset mechanism comprising a support carrying a turnable ratchet wheel movable from an initial starting position against a clock spring, a lever and pawl member on the support to step up the wheel, a lever and dog member on the support to prevent retrograde motion of the wheel, interrelated parts between the dog and pawl members, an escapement dog member for the wheel operatively associated with the lever and dog member, a third lever member on the support including means to engage a part on the escapement dog member, and separate actuating devices for the first, second and third lever members.

4. A combined step-up, escapement and reset mechanism comprising a support carrying a turnable ratchet wheel movable from an initial starting position against a clock spring, a lever and pawl member on the support to step up the wheel, a lever and dog member on the support to prevent retrograde motion of the wheel, interrelated parts between the dog and pawl members, an escapement dog member for the wheel operatively associated with the lever and dog member, a third lever member on the support including means to engage a part on the escapement dog member, and separate electromagnetic devices on the support including circuits for causing operation of the three lever members.

5. A combined step-up, escapement and reset mechanism comprising a support carrying a turnable ratchet wheel movable from an initial starting position against a clock spring, a lever and pawl member on the support to step up the wheel, a lever and dog member on the support to prevent retrograde motion of the wheel, interrelated parts between the dog and pawl members, an escapement dog member for the wheel operatively associated with the lever and dog member, a third lever member on the support including means to engage a part on the escapement dog member, separate electromagnetic devices including circuits for operating the three lever members, and means whereby the first device may be operated individually to step up the ratchet wheel, the second device may be operated individually to cause escapement of the ratchet wheel and the second and third devices may be operated conjointly to free all holding means from the wheel to permit it to be driven back by the clock spring to the initial starting position.

6. A step-up mechanism comprising a support, a ratchet wheel turnable thereon from a starting position against a clock spring, a pawl to step up the wheel, a lever on the support including a spring pressed holding dog for the wheel, an escapement dog member fulcrumed on the same axis as the lever and spring connected to the lever to hold a stop portion thereof yieldably against the lever, a wheel tooth engaging portion on the escapement dog member acting alternately with the holding dog, and means to actuate the lever.

7. A step-up mechanism comprising a support, a ratchet wheel turnable thereon from a starting position against a clock spring, a pawl to step up the wheel, a lever on the support including a spring pressed holding dog for the wheel, an escapement dog member fulcrumed on the same axis as the lever and spring connected to the lever to hold a stop portion thereof yieldably against the lever, a wheel tooth engaging portion on the escapement dog member acting alternately with the holding dog, interengageable portions between the pawl and holding dog, means to actuate the pawl, and separate means to actuate the lever, the interengageable portions serving when the lever is operated to free the pawl and holding dog from the wheel.

CHARLES T. BREITENSTEIN.